United States Patent [19]

Ryan

[11] Patent Number: 4,601,048
[45] Date of Patent: Jul. 15, 1986

[54] SERIAL MINIMUM SHIFT-KEYED MODEM

[76] Inventor: Carl R. Ryan, 13792 E. Pony La., Gilbert, Ariz. 85234

[21] Appl. No.: 596,117

[22] Filed: Apr. 2, 1984

[51] Int. Cl.⁴ .................................. H04L 27/10
[52] U.S. Cl. .......................... 375/47; 375/90; 329/110
[58] Field of Search ............... 375/45, 47, 64, 88, 375/90; 329/122, 110; 455/112

[56] References Cited

U.S. PATENT DOCUMENTS

| 2,977,417 | 3/1981 | Doelz et al. | 375/47 |
| 3,668,562 | 6/1972 | Fritkin | 435/112 |
| 3,674,934 | 7/1972 | Gooding et al. | 375/90 |
| 3,992,617 | 11/1976 | Epstein | 375/90 |
| 3,993,868 | 11/1976 | Balcewicz | 375/47 |
| 4,020,283 | 4/1977 | Epstein | 375/90 |
| 4,028,490 | 6/1977 | Epstein | 375/90 |
| 4,072,905 | 2/1978 | Keelty | 329/122 |
| 4,238,783 | 12/1980 | Miller | 455/112 |
| 4,324,001 | 4/1982 | Rhodes | 375/90 |
| 4,359,692 | 11/1982 | Ryan | 329/50 |
| 4,500,856 | 2/1985 | Childs | 375/64 |

FOREIGN PATENT DOCUMENTS 57-207463 12/1982 Japan .................................. 375/90

Primary Examiner—Robert L. Griffin
Assistant Examiner—Stephen Chin

[57] ABSTRACT

An apparatus and method is disclosed of an SMSK/N concept that utilizes a divide-by-N device in the modulator and a multiply-by-N device in the demodulator to provide improved bandwidth efficiency over conventional SMSK devices. This apparatus provides reduced bandwidth without an excessive increase in the power required for transmission.

4 Claims, 7 Drawing Figures

*- PRIOR ART -*

SERIAL MINIMUM SHIFT-KEYED MODEM

BACKGROUND OF THE INVENTION

1. Field of the Invention

This invention relates, in general, to the serial minimum shift-keyed transmission concept, and more particularly, to a serial minimum shift-key divide-by-N modem.

2. Description of the Background

Much work has been done in the area of minimum shift-keyed (MSK) and in the serial MSK (SMSK) transmission areas. One continuing goal in this area is to reduce the bandwidth of the signal without causing an unreasonable increase in the power required to operate at that bandwidth or increasing the bit error rate (BER) of the transmission.

SUMMARY OF THE INVENTION

Accordingly, it is an object of the present invention to provide an apparatus and method that has improved bandwidth efficiency.

A further object of the present invention is to provide an apparatus and method having a bit error rate (BER) nearly the same as MSK.

Still another object of the present invention is to provide an apparatus and method having a simple hardware design which is economical to implement.

Yet another object of the present invention is to provide an apparatus and method which can be incorporated into an existing MSK design with a minor increase in spectral energy.

The above and other objects and advantages of the present invention are provided by an apparatus and method of improving spectral efficiency while also improving the BER relative to MSK.

A particular embodiment of the present invention comprises an apparatus and method for reducing the rate of the phase shift and including more states. This is accomplished by using a modulation index of 0.25 instead of 0.5 as is used in MSK. The basic technique used to accomplish this is to divide the modulation index of the MSK signal by two at the transmitter. Although a divide-by-two is disclosed by this particular embodiment it is to be understood that the signal may be divided by any integer value N. The division is accomplished by a conventional high speed flip-flop divider. The resulting signal is then filtered and up converted to the desired operating frequency. The reverse operation is performed at the receiving end.

DETAILED DESCRIPTION OF THE INVENTION

Figure 1:
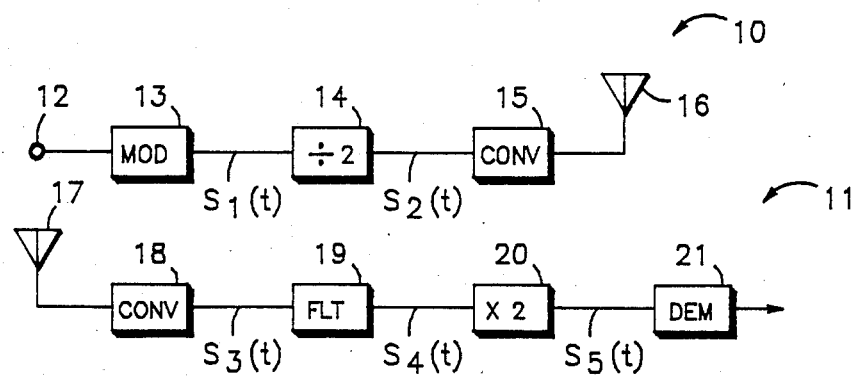
FIG. 1 is a block diagram of a bandpass implementation of an SMSK/2 modem embodying the present invention.

Referring to FIG. 1 a block diagram of a bandpass implementation of an SMSK/2 modem embodying the present invention is illustrated. The SMSK/2 modem consists of a modulator, generally designated 10, and a demodulator, generally designated 11. A data signal is input to modulator 10 at a port 12. The data signal is then transmitted to an MSK modulator 13 which produces a signal $S_1(t)$ which is defined by the equation:

$$S_1(t) = \sin(\omega_o t + \phi(t)) \quad (1)$$

where $\omega_o$ is the reference frequency and $\phi(t)$ is the modulation index. For MSK $\phi(t)$ has the following characteristics:

$$\phi(t) = \begin{cases} \dfrac{\pi t}{2T} & \text{for Logic 1} \\ -\dfrac{\pi t}{2T} & \text{for Logic 0} \end{cases} \quad (2)$$

where T is the data symbol period. Next, signal $S_1(t)$ is transmitted, from MSK modulator 13, to a divide-by-two circuit 14 producing a signal $S_2(t)$ which is defined by the equation:

$$S_2(t) = \sin\left(\frac{\omega_o t}{2} + \frac{\phi(t)}{2}\right). \quad (3)$$

Signal $S_2(t)$ has the desired modulation index of 0.25, as opposed to 0.5 for MSK, and the center frequency is reduced by a factor of two. Signal $S_2(t)$ is then transmitted to an up converter 15 increasing the frequency for transmission. This final signal is then transmitted from antenna 16 of modulator 10 to antenna 17 of demodulator 11.

Demodulator 11 performs the reverse of the above operation. The signal received by antenna 17 is transmitted to a down converter 18 which produces a signal $S_3(t)$ defined by the equation:

$$S_3(t) = [S_2(t)]^2 = \left[\sin\left(\frac{\omega_o t}{2} + \frac{\phi(t)}{2}\right)\right]^2. \quad (4)$$

Signal $S_3(t)$ is then transmitted to a matched filter 19 to filter out the second harmonic of signal $S_3(t)$ producing signal $S_4(t)$ defined by equation:

$$S_4(t) = \tfrac{1}{2}\sin(\omega_o t + \phi(t)). \quad (5)$$

Signal $S_4(t)$ has the required modulation index for demodulation with a conventional MSK demodulator. Matched filter 19 is designed to optimize the circuit by creating the maximum signal-to-noise ratio. This filtering minimizes the BER and must be selected for this application. Signal $S_4(t)$ is then transmitted to a multiply-by-two circuit, 20, which produces a signal $S_5(t)$ defined by the equation:

$$S_5(t) = \sin(\omega_o t + \phi(t)). \quad (6)$$

As can be seen from the above, the signal $S_1(t)$ of equation 1 is the same as $S_5(t)$ of equation 6. Signal $S_5(t)$ is then transmitted to an MSK demodulator 21 where the data output is produced. Thus, this method of modulation, using an index of 0.25, results in a bandwidth efficiency of two bits per hertz.

It is to be understood that the above described circuit will operate with a divide-by-N, where N is an integer value, as well as with a divide-by-two.

Figure 2:
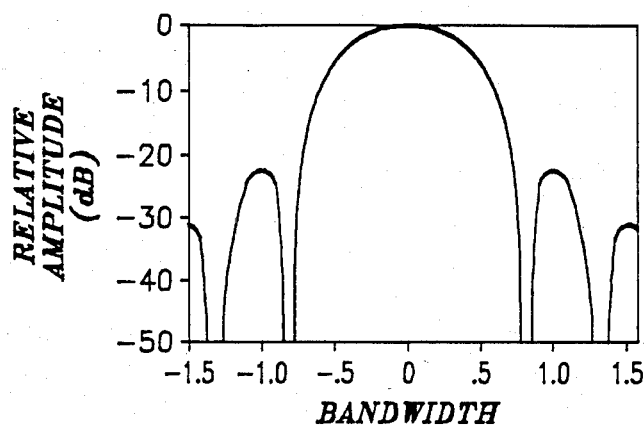
FIG. 2 is a power spectral density graph of a prior art SMSK.
Figure 3:
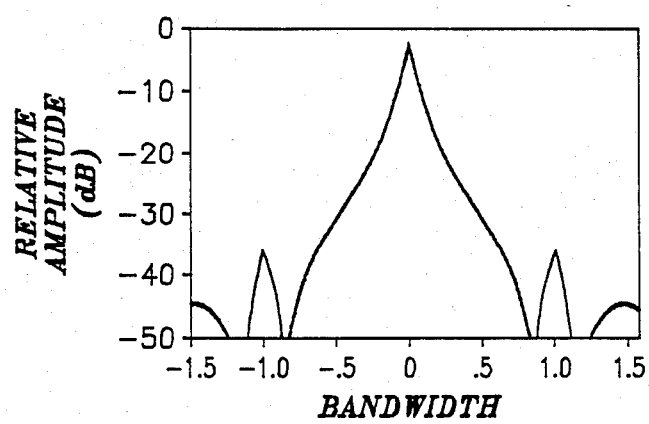
FIG. 3 is a power spectral density graph of the SMSK/2 circuit of FIG. 1.

FIG. 2 represents the resulting spectral density graph of an SMSK modulator. FIG. 3 represents the resulting spectral density graph of the SMSK/2 of FIG. 1. As can be seen by a comparison of FIGS. 2 and 3 the desired reduction in bandwidth is clearly evident. More of the signal is contained between a ±0.5 bandwidth in FIG. 3 than in FIG. 2, giving the SMSK/2 an improved bandwidth efficiency.

Figure 4:
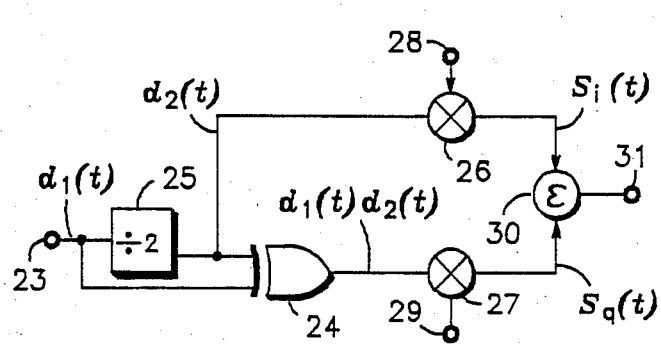
FIG. 4 is a block diagram of a baseband implementation of an SMSK/2 modulator embodying the present invention.

Referring now to FIG. 4, a block diagram of baseband implementation of an SMSK/2 modulator, generally designated 22, embodying the present invention is illustrated. This circuit does not require the use of an MSK modem for its operation. Device 22 receives an input data stream $d_1(t)$ from a node 23. Node 23 is coupled to a first input of a dual input exclusive OR gate 24 and to a divide-by-two circuit 25. Divide-by-two circuit 25 reduces the number of transitions by ½ and produces a signal $d_2(t)$ which is transmitted to a second input of gate 24 and to a mixer 26. Gate 24 combines signals $d_1(t)$ and $d_2(t)$ to produce a signal $d_1(t)d_2(t)$ which is transmitted to a mixer 27. Mixer 26 has a second input coupled to a node 28 which receives a signal, $\sin \omega_0 t$. Mixer 26 produces a signal $S_i(t)$ which is defined by the equation:

$$S_i(t) = d_2(t)\sin \omega_0 t. \quad (7)$$

Mixer 27 has a second input coupled to a node 29 which receives a signal, $\cos \omega_0 t$. Mixer 27 produces a signal $S_q(t)$ which is defined by the equation;

$$S_q(t) = d_1(t)d_2(t)\cos \omega_0 t. \quad (8)$$

Signals $S_i(t)$ and $S_q(t)$ are then transmitted to a quadrature mixer 30 which produces a signal $S(t)$ defined by the equation:

$$S(t) = d_2(t)\sin \omega_0 t + d_1(t) d_2(t)\cos \omega_0 t. \quad (9)$$

Signal $S(t)$ is then transmitted to a hard limiter and bandpass filter (not shown) to smooth out the steps.

Figure 5:
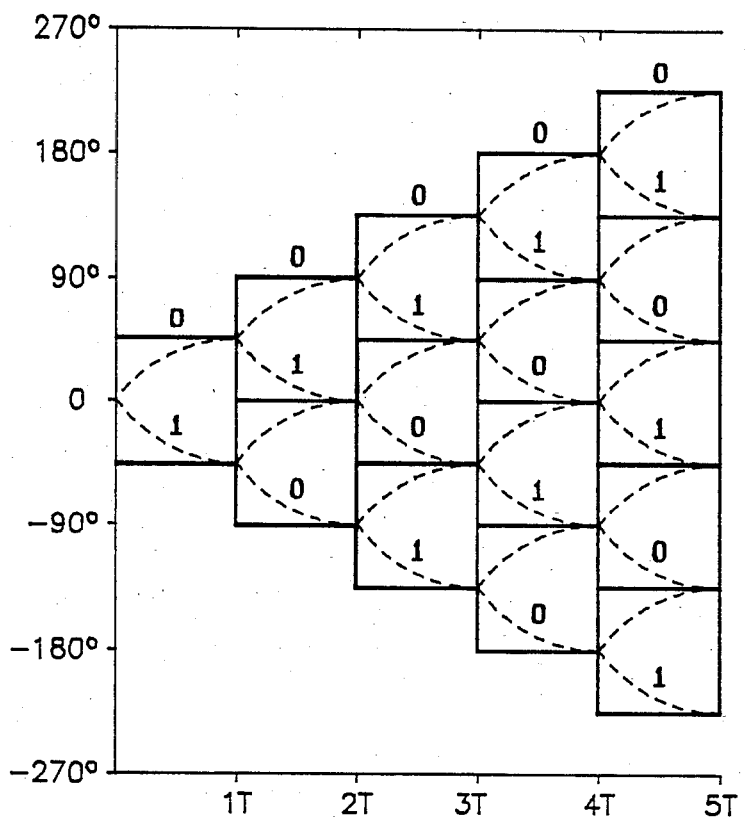
FIG. 5 is a phase trellis diagram of the SMSK/2 modulator of FIG. 4.

Referring now to FIG. 5 a phase trellis of signal $S(t)$, equation (9) above, is illustrated. FIG. 5 illustrates 45° phase steps and 45° phase ramps. The 45° phase steps would be signal $S(t)$ without using a bandpass filter. These steps are smoothed by the use of the hard limiter and bandpass filter to produce the 45° phase ramps illustrated by the dashed lines. As illustrated in FIG. 5 commencing at time zero and zero degree phase the phase will be increased 45° for a logic zero and decreased 45° for a logic 1, assuming that the previous digit was a logic zero. After the initial step if the following digit remains the same the phase will increase by 45 degrees; if the digit changes (1 to 0 or 0 to 1) the phase will decrease by 45 degrees.

Figure 6:
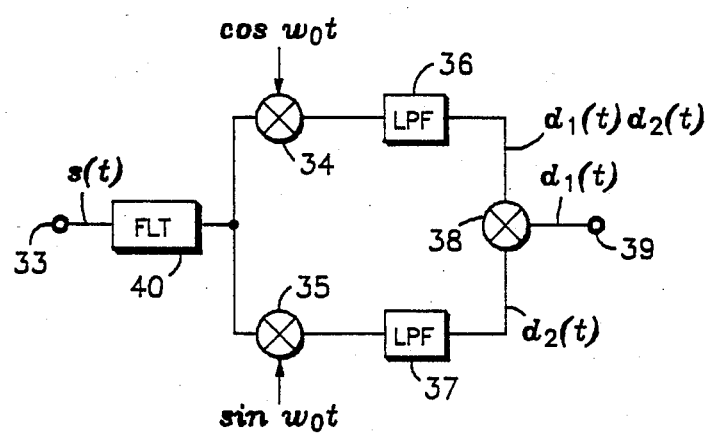
FIG. 6 is a block diagram of a baseband implementation of an SMSK/2 demodulator embodying the present invention.

Referring now to FIG. 6, a block diagram of a baseband implementation of an SMSK/2 demodulator, generally designated 32, is illustrated. Demodulation of signal $S(t)$ generated by modulator 22, FIG. 4, is accomplished in a manner similar to the SMSK concept except that parallel data outputs are obtained, one from the I channel phase detector and one from the Q channel phase detector. Signal $S(t)$ is first transmitted to a matched filter 40, from a node 33, which filters out the noise as matched filter 19 in FIG. 1. Signal $S(t)$ is then transmitted to a mixer 34 and a mixer 35 where it is mixed with signals defined by $\cos \omega_0 t$ and $\sin \omega_0 t$, respectively. The outputs from mixers 34 and 35 are then transmitted to low pass filters 36 and 37, respectively. The signals from low pass filters 36 and 37 are then transmitted to mixer 38 where they are combined to form data output $d_1(t)$, which is the same signal input to the SMSK/2 modulator 22, FIG. 4. Signal $d_1(t)$ is then transmitted to a node 39 and out of demodulator 32.

It is to be understood that the above described SMSK/2 modulator 22 and demodulator 32 will operate with a divide-by-N, where N is an integer value, as well as with a divide-by-two as described.

Figure 7:
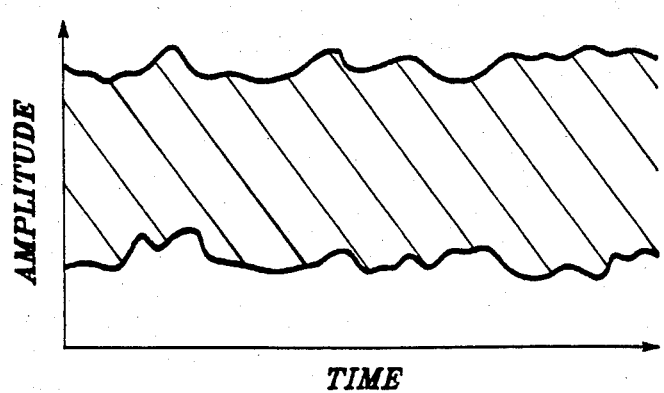
FIG. 7 is a graph of the envelope amplitude of a signal generated by the SMSK/2 modulator of FIG. 5.

Referring now to FIG. 7 a graph of the envelope amplitude of a modulated and filtered signal of SMSK/2 modulator 22, FIG. 4, is illustrated. This graph represents the upper and lower lines of the envelope with the signal being represented by the lined area in between. As illustrated, the envelope is relatively constant over an extended period of time. At lower frequencies the envelope would appear more constant.

Thus, it is apparent that there has been provided, in accordance with the invention, a device and method that fully satisfies the objects, aims, and advantages set forth above.

It has been shown that the present invention provides an SMSK that has improved bandwith efficiency and an improved bit error rate relative to MSK. It has also been shown that the present invention has a simple hardware design that would be economical to implement in existing MSK designs by using the SMSK concept plus a simple technique for altering the modulation index.

While the invention has been described in conjunction with specific embodiments thereof, it is evident that many alterations, modifications, and variations will be apparent to those skilled in the art in light of the foregoing description. Accordingly, it is intended to embrace all such alternatives, modifications, and variations as fall within the spirit and broad scope of the appended claims.

I claim:

1. An SMSK/2 (Serial Minimum Shift Keyed/2) apparatus comprising:
    SMSK/2 modulator means for modulating a data signal, said SMSK/2 modulator means including:
        an MSK (Minimum Shift Keyed) modulator coupled to receive said data signal and having a modulation index, said MSK modulator producing a modulated data signal;
        divide-by-2 means for altering said modulation index of said MSK modulator, said divide-by-2 means being coupled to receive said modulated data signal from said MSK modulator means;
        up converter means for increasing the frequency of said modulated data signal, said up converter means being coupled to said divide-by-2 means;
        a first antenna coupled to said up converter means; and
    SMSK/2 demodulator means for demodulating said data signal, said SMSK/2 demodulator means including:

down converter means for decreasing the frequency of said modulated data signal, said down converter means being coupled to receive said modulated data signal;

a matched filter coupled to said down converter means;

multiply-by-2 means for reconstructing said modulation index of said MSK modulator means, said multiply-by-2 means being coupled to said matched filter;

an MSK demodulator coupled to said multiply-by-2 means.

2. A method of producing SMSK/2 (Serial Minimum Shift Keyed/2) data signal comprising:

providing a data signal;

modulating said data signal utilizing an MSK modulator producing a first modulated signal;

altering the modulation index of said first modulated data signal utilizing a divide-by-2, producing a second modulated data signal;

filtering said second modulated data signal in a matched filter;

increasing the frequency of said second modulated data signal;

transmitting said second modulated data signal;

receiving said second modulated data signal;

decreasing the frequency of said second modulated data signal;

reconstructing the modulation index of said second modulated signal utilizing a multiply-by-2 producing said first modulated data signal; and demodulating said modulated data signal in an MSK demodulator producing said data signal.

3. An SMSK/N (Serial Minimum Shift Keyed/N) device, where N is an integer, having a data input for receiving a data signal, comprising:

a divide-by-N having an input and an output, said input being coupled to said data input;

a dual input logic gate having a first input, a second input and an output, said first input being coupled to said output of said divide-by-N and said second input being coupled to said data input;

a first mixer having a first input, a second input and an output, said first input being coupled to said output of said divide-by-N and said second input being coupled to receive a first signal, said first signal being defined by sine $\omega_o t$;

a second mixer having a first input, a second input and an output, said first input being coupled to said output of said dual input logic gate and said second input being coupled to receive a second signal, said second signal being defined by cosine $\omega_o t$;

a quadrature mixer having a first input, a second input and an output, said first input being coupled to said output of said first mixer and said second input being coupled to said output of said second mixer;

a first antenna being coupled to said output of said quadrature mixer, said first antenna transmitting a modulated signal;

a second antenna receiving said modulated signal from said first antenna;

a second filter having an input and an output, said input being coupled to said second antenna;

a third mixer having a first input, a second input and an output, said first input being coupled to said second filter and said second input being coupled to receive a third signal, said third signal being defined by cosine $\omega_o t$;

a fourth mixer having a first input, a second input and an output, said first input being coupled to said output of said second filter and said second input being coupled to receive a fourth signal being defined by sine $\omega_o t$;

a first low pass filter having an input and an output said input being coupled to said output of said third mixer;

a second low pass filter having an input and an output, said input being coupled to said output of said fourth mixer;

a fifth mixer having a first input, a second input and an output, said first input being coupled to said output of said first low pass filter and said second input being coupled to said output of said second low pass filter; and an output node being coupled to said output of said fifth mixer.

4. The SMSK/N device of claim 3 wherein the variable N is two.

* * * * *